United States Patent [19]

Yoshida et al.

[11] Patent Number: 5,021,890
[45] Date of Patent: Jun. 4, 1991

[54] METHOD OF AND APPARATUS FOR FACSIMILE COMMUNICATIONS

[75] Inventors: Isao Yoshida; Hidetoshi Inoue; Kanji Arai, all of Tokyo, Japan

[73] Assignee: Oki Electric Industry Co., Ltd., Tokyo, Japan

[21] Appl. No.: 326,801

[22] Filed: Mar. 21, 1989

[30] Foreign Application Priority Data

Mar. 25, 1988 [JP] Japan .................................. 63-69594

[51] Int. Cl.$^5$ ............................................. H04M 1/00
[52] U.S. Cl. ................................. 358/405; 358/406; 358/437
[58] Field of Search ........................ 358/406, 405, 437

[56] References Cited
U.S. PATENT DOCUMENTS 4,153,916 5/1979 Miwa et al. .......................... 358/406
4,630,126 12/1986 Kaku et al. .......................... 358/406
4,727,429 2/1988 Ueno ................................... 358/405

Primary Examiner—Edward L. Coles, Sr.
Attorney, Agent, or Firm—Spencer & Frank

[57] ABSTRACT

Stable facsimile communications and reduced deterioration in image quality are achieved, when standard facsimile apparatuses communicate using a communication network composed a subnetwork with relatively good transmission quality such as a wire system and a subnetwork with relatively bad transmission quality such a mobile system subnetwork, both subnetworks being interspersed between the facsimile apparatuses, by inserting a pair of FAX signal converting apparatuses into the communication channel between the facsimile apparatuses for error control responsive to the quality of the channel in use.

7 Claims, 4 Drawing Sheets

BLOCK DIAGRAM SHOWING A FACSIMILE APPARATUS OF THE PRESENT INVENTION

ILLUSTRATION OF A RELAY SYSTEM SHOWING AN EMBODIMENT OF THE PRESENT INVENTION (IN A GENERAL COMMUNICATION NETWORK)

BLOCK DIAGRAM SHOWING A FACSIMILE SIGNAL CONVERTER APPARATUS

ILLUSTRATION OF A RELAY SYSTEM SHOWING ANOTHER EMBODIMENT OF THE PRESENT INVENTION (IN CASE OF INCLUSION OF A MOBILE TELEPHONE NETWORK)

BLOCK DIAGRAM SHOWING A FACSIMILE APPARATUS OF THE PRESENT INVENTION

METHOD OF AND APPARATUS FOR FACSIMILE COMMUNICATIONS

BACKGROUND OF THE INVENTION

1. Field of the Invention

The present invention relates to facsimile communications between standard facsimile apparatuses, and more particularly to facsimile communications through a communication network composed of networks with good transmission quality, such as a wire system subnetwork, and of subnetworks with relatively bad transmission quality, such as an open-wire carrier circuit and a mobile system network, the foregoing subnetworks of good and bad quality being interspersed in the communication network between the facsimile apparatuses.

Communications between facsimile apparatuses are primarily achieved conventionally through a wire system network, such as a public data network (PDN), an integrated services digital network (ISDN), a public switched data network (PSDN) or a facsimile communication network (FICS), with equipment for use in the above networks. International standards for example the CCITT Recommendations, facsimile communications through a wire system network in particular. Standard facsimile systems, enjoying wide application over domestic and overseas areas, adopt the international standards or at least a standards based thereupon. However such standards are designed for a wire system network with relatively good transmission quality, without having any protection against the occurrence of noises and broken lines, e.g., a powerful error correcting function.

Automobile telephones and other mobile networks suffer from a variety of disturbances because of their inclusion of mobile radio channels. These disturbances include internal noises emitted from radio transmitter-receiver units (TRU), urban noises such as multipath phasing and shadowing which occur during propagation of electric waves and the effect on control signals and voice channels of the hand-off procedure peculiar to a cellular system, which would severely reduce the quality of a network with regard to facsimile communications. The use of conventional standard facsimile devices therefore results in deteriorated image quality or frequent interruptions of communications, as reported in "Experimental Facsimile Signal Transmission in Mobile Communication channels", Omori and Kinoshita, No. 2432, the Unified Meeting of the Society of the Electro Communication, 1984.

SUMMARY OF THE INVENTION

In view of the drawbacks of the conventional techniques, it is an object of the present invention to provide a method of and an apparatus for stable facsimile communications, with the facsimile communications being substantially free of deterioration in the image quality even if the communication networks includes a mobile network or the like suffering from severe disturbances.

To achieve the above object, the present invention comprises facsimile signal converting apparatuses for effecting facsimile communications mediated by a communication network composed of a wire system subnetwork with relatively good transmission quality, such as a public data network (PDN) or an integrated services data network (PSDN), and of a subnetwork with bad transmission quality, such as an open-wire carrier circuit with bad and a mobile system (hereinafter referred to collectively as a mobile system subnetwork), the foregoing facsimile signal converting apparatuses being located on a transmission path connected between standard facsimile apparatuses which are in communication with one another, with the whole of the mobile system subnetwork or a fractional part thereof being included in the transmission path.

Each of the facsimile signal converting apparatuses is composed of realization means, cooperating with one of the standard facsimile apparatuses for realizing a standard transmission control procedure, and of a further realization means for realizing an impoved transmission control procedure during communication between the facsimile signal converting apparatuses, the further realization means having a powerful error control function capable of stable and error-free facsimile communications with little deterioration of image quality despite the mobile system subnetwork, and further including a converting function between the standard transmission control procedure or its equivalent and the improved transmission control procedure (protocol converting function).

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Figure 1:
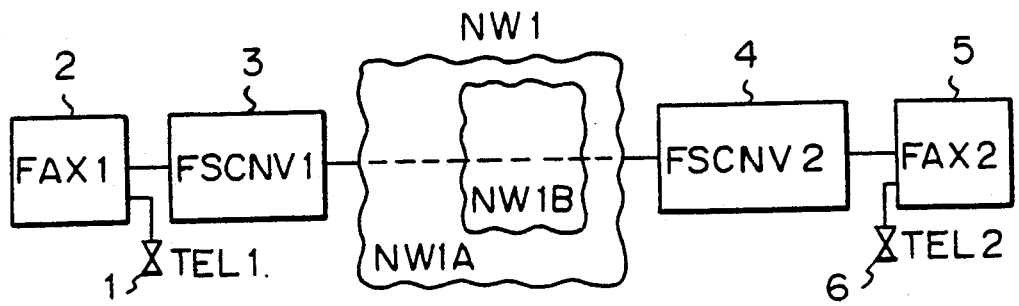
FIG. 1 is an illustration of a relay system showing an embodiment of a facsimile communication system according to the present invention.

Referring to FIG. 1, a relay system in an embodiment of the present invention is illustrated. Telephone sets 1 and 6 (TEL 1 and TEL 2) are connected respectively to standard facsimile apparatuses 2 and 5 (FAX 1 and FAX 2) each including therein a standard transmission procedure or protocol such as CCITT Recommendation T30 or T70, for example. The standard facsimile apparatuses 2 and 5 are connected respectively to facsimile signal converting apparatuses 3 and 4 (FSCNV 1 and FSCNV 2). The facsimile signal converting apparatuses 3 and 4 are connected to each other through a communication network NW1 composed of a subnetwork NW1A with relatively good channel quality, such as for example a wire system, and of a subnetwork NW1B with relatively bad channel quality, such as for example an open-wire carrier channel and a mobile system subnetwork. For convenience, the facsimile apparatus 2 will be hereafter referred to as the calling station, while the facsimile apparatus 5 will be referred to as the called station.

Figure 2:
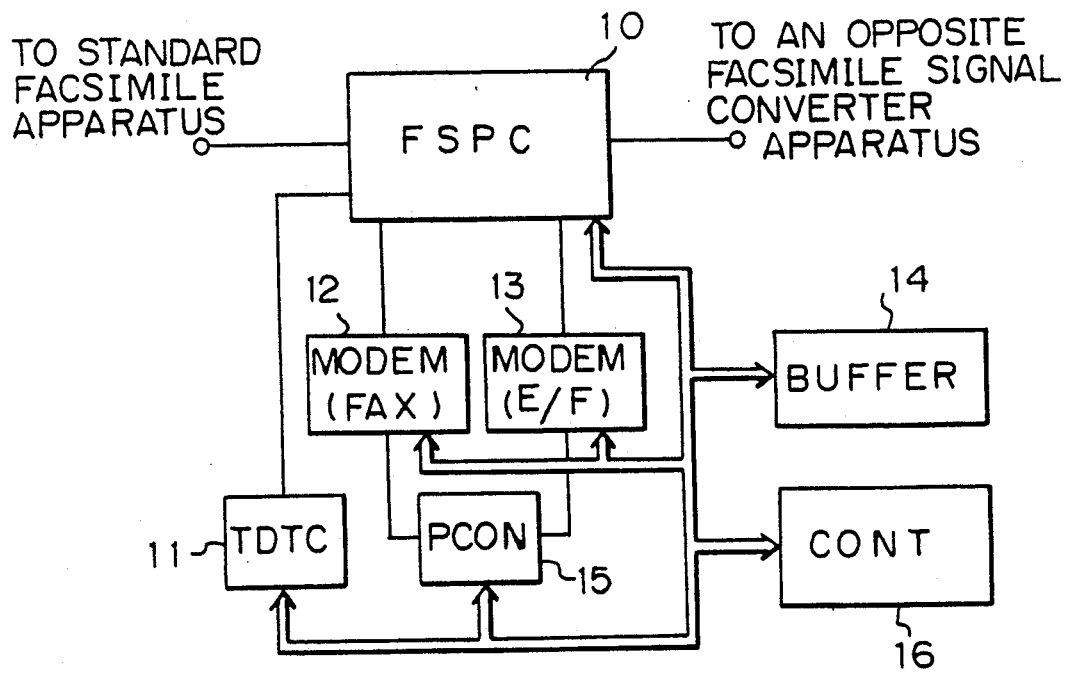
FIG. 2 is a block diagram of a facsimile signal converting apparatus.

Referring further to FIG. 2, the facsimile signal converting apparatus 3 is illustrated in the form of a functional block diagram. In the figure, designated at 10 is a facsimile signal path control unit (FSPC), 11 designates a tone detecting unit (TDTC), and 12 is a modem (MODEM (FAX)) for a standard transmission control procedure or protocol for communication with the standard facsimile apparatus 3. Reference number 13 designates a modem (MODEM (E/F)) for a special transmission control procedure or protocol for communication between the facsimile signal converting apparatuses 3 and 4. Reference number 14 identifies a buffer memory (BUFFER) for storage of received control signals and message signals, 15 is an information/protocol converting unit (PCON), and 16 is an apparatus control unit (CONT). Facsimile signal converting apparatus 4 has the same construction.

The facsimile signal path control unit (hereafter referred to as the FAX signal path control unit) 10 has the function of transmitting signals from the calling side (such as a calling completion signal, a dialing signal, etc.) to the network NW1 and transmitting signals from the network NW1 (such as a dial tone, calling and busy tones, etc.) to the calling side, or the function of transmitting signals (such as a calling signal, a broken line signal, etc.) from the network NW1 to the called side and transmitting answer and interruption signals from the called side to the network NW1. Fax signal path control unit 10 also includes means to assure voice communications in a manual mode.

The information/protocol converting unit 15 includes adaptive error control means for judging by itself the conditions of the channel in use for selecting and setting the proper error control mode. For example, if the mobile system subnetwork is operating under conditions such that the received electric field is very intense the channel is stable the adaptive error control means provides an error detecting function based upon a cyclic code to the mobile system subnetwork. However if the same subnetwork is operating under conditions such that the electric field is weak and of the channel is unstable, the adaptive error control means provides a self correcting function based upon a diffusion code to the channel. If the conditions are still worse it provides a more powerful error correcting function. It can thus select an appropriate error control mode from among a plurality of modes combined with a variable block length type request repeat function. Additionally, the information/protocol converting unit 15 assures automatic protocol conversion in response to the conditions of the transmission speed of the modem in use, paper size, etc.

Referring here to FIG. 1, the operation of the embodiment will now be described when the calling side facsimile apparatus 2 manually transmits any signal to the called side automatic facsimile apparatus 5.

With an operator actuating the telephone set 1 and the facsimile appratus 2 to make the call, a call signal is transmitted to the communication network NW1 through the FAX signal converting apparatus 3 for starting the connection for the call. Then, the telephone set 1 or the facsimile apparatus 2 sends out a selection signal for connection of the called station through the FAX signal converting apparatus 3 to the communication network NW1. The communication network NW1 performs predetermined connection operations after receiving the selection signal and sends out a call signal through the FAX signal converting appartus 4 to the facsimile appartus 5 and the telephone set 6. The facsimile apparatus 4 detects the call signal and emits an answer signal. The FAX signal converting apparatus 4 relays the answer signal to the communication network NW1, which then performs predetermined operations upon reception of the answer signal for looping a channel from the telephone set 1 or the facsimile apparatus 2 to the facsimile apparatus 5 or the telephone set 6 through the FAX signal converting apparatus 3, communication network NW1 and FAX signal converting apparatus 4. In succession, the facsimile apparatus 5 sends out a call-in identification signal CED which is then detected by the FAX signal converting apparatuses 4 and 3 for preparation of transmission/reception of the facsimile signal. The calling side operator ascertains whether the call is connected by listening for the call-in identification signal CED, and starts the facsimile transmission. The above procedure corresponds to phase A of the facsimile communication procedure. For the phases B, C, D, a tonal signaling system, a binary code signaling system, and a combination thereof are available. In the following description, the binary signaling system will be assumed.

Figure 3:
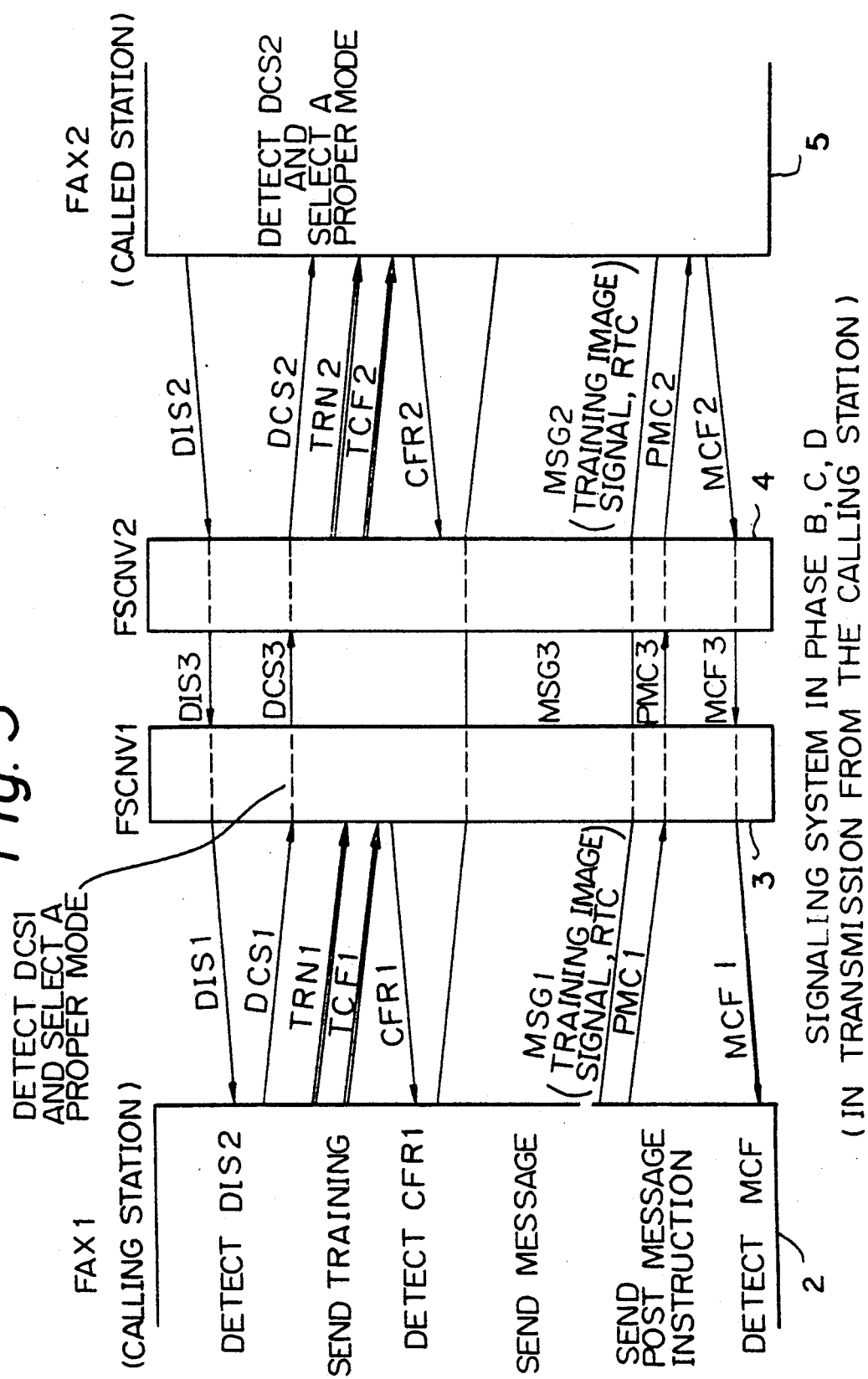
FIG. 3 is an illustration showing the signaling in phases B, C and D during transmission from a calling station.
Figure 4:
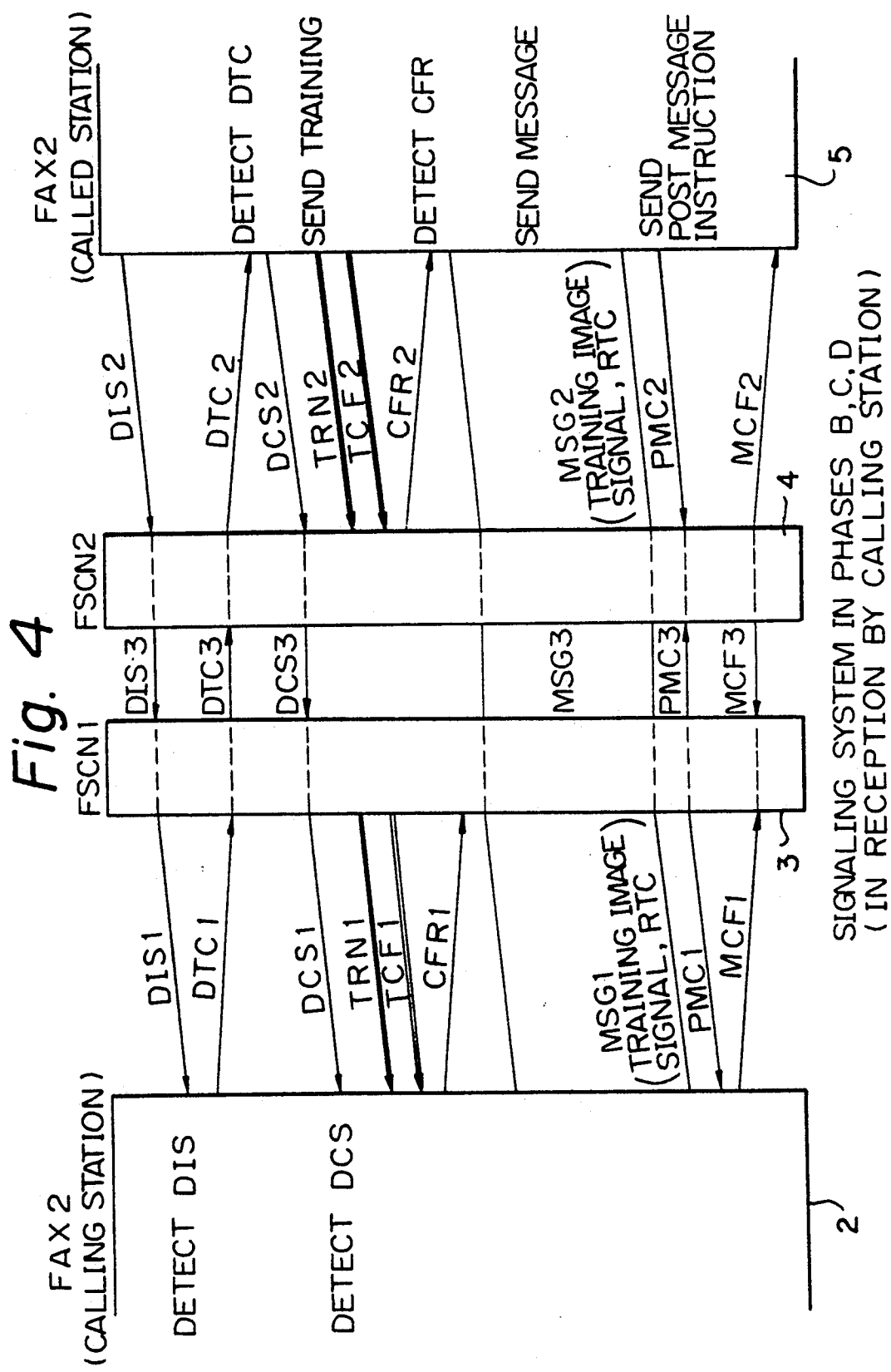
FIG. 4 is an illustration showing the signaling in phases B, C and D during reception by the calling station.

FIGS. 3 and 4 are diagrams for phases B, C and D during operation the above-described embodiment of the present invention, FIG. 3 showing the case of facsimile transmission from the calling station and FIG. 4 showing the case of facsimile reception by the same. Low speed modem operation of 300 to 2400 bps is used for transmission of control signals between the facsimile apparatus 2 and the FAX signal converting apparatus 3 and between the facsimile apparatus 5 and the FAX signal converting apparatus 4, while a high speed is used for transmission of training, TCF and message signals. The transmission speeds between the facsimile apparatus 2 and the FAX signal converting appartus 3 and between the facsimile apparatus 5 and the FAX signal converting appartus 4 may be set in response to the channel conditions and are not necessarily the same. In addition, control signals and message signals are transmitted between the FAX signal converting apparatuses 3 and 4 while subjecting those signals to information and protocol conversions as needed and successively permitting a high speed error-free modem provided with a powerful error control function to process them. The facsimile apparatus 5 sends out a digital identification signal DIS 2 to the FAX signal converting apparatus 4, which signal is converted therein to DIS 3 and again to a digital identification signal DIS 1 in the FAX signal converting apparatus 3, and detected by the facsimile apparatus 2 as the latter signal DIS 1. After the facsimile apparatus 2 receives DIS 1 and sends out a digital instruction signal DCS 1, the FAX signal converting apparatus 3 detects it as the same signal DCS 1 for its mode selection while the FAX signal converting apparatus 4 detects it as DIS 3 for its mode selection. In succession, the facsimile apparatus 2 sends out training signals TRN 1 and TCF 1, and then the FAX signal converting apparatus 3 sends out a reception-ready confiramion signal CFR 1. In contrast the FAX signal converting apparatus 4 sends out training signals TRN 2 and TCF 2 to the facsimile apparatus 5, and then the facsimile apparatus 5 sends out a reception-ready confiramtion signal CFR 2 to the FAX signal converting apparatus 4. Then, the facsimile apparatus 2 sends out a message signal MSG 1 which includes an image signal and further a post-message instruction signal PCM 1, such as a message end signal EOM and a procedure end signal EOP or a multipage signal MPS, etc., at the end of the message. The FAX signal converting apparatus 3 after the foregoing conversion sends out MSG 3 and PMC 3 by use of the error-free (reference number 13 in FIG. 2). The FAX signal converting apparatus 4 detects these signals and after an inverse conversion, emits them to the facsimile apparatus 5 as MSG 2 and PMC 2. The facsimile apparatus 2, after detection of the above signals, sends out a message confirmation signal MCF 2 which is detected by the facsimile apparatus 2 as MCF 1.

The control procedure phase D is thus completed as described above.

In addition, when completion of the call is desired, the control advances to phase E. The facsimile apparatus 2 sends out channel interruption instructions which are detected by the FAX signal converting apparatuses 3 and 4 and by the facsimile apparatus 5, whereupon the latter apparatuses 3, 4 and 5 start their release operation and then become available for successive calls.

When it is the calling station that is to receive the facsimile transmission, as illustrated in FIG. 4, the facsimile apparatus 5 again sends out a digital identification signal DIS 2, and the facsimile apparatus 2 detects it as DIS 1. Then, the facsimile apparatus 2 sends out digital transmission instructions DTC 1 which are detected by the facsimile apparatus 5 as DTC 2.

The handshake routine thereafter is the same as that in FIG. 3, but with the situation being reversed between the calling and called stations.

Although the above description was based on the binary code signaling system, the same may be applied to the tonal signaling system too. Additionally, although Group 4 is applicable to the standard facsimile apparatus, the control procedure between the standard facsimile apparatus and the FAX signal converting apparatus needs to conform to CCITT Recommendations T70, T71 and others. Furthermore, the FAX signal converting apparatuses can be located at a node in the communication network, e.g., on the boundary between subnetworks such as a subscriber's switching office and an interrupted switching office or PSTN/PDN/ISDN, or in the vicinity of those subnetworks.

Figure 5:
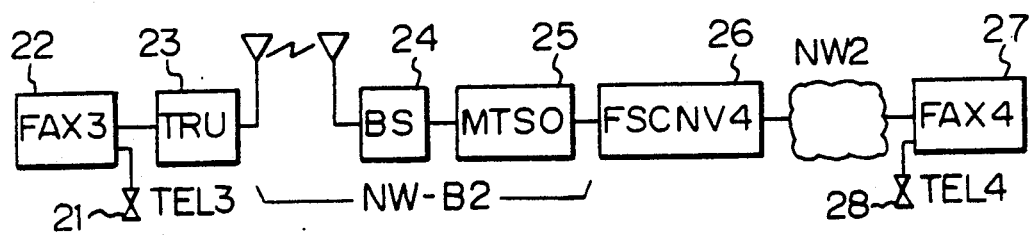
FIG. 5 is an illustration of a relay system showing another embodiment of the facsimile communication system of the present invention.

Referring further to FIG. 5, another embodiment of the present invention is illustrated wherein a facsimile apparatus having a special transmission control procedure is used in a communication network which includes a mobile telephone. As illustrated in the figure, a mobile telephone set (control unit part) 21 (TEL 3) is connected with a facsimile apparatus 22 (FAX 3) including therein the special transmission control procedure. Facsimile apparatus 22 is connected with a mobile telephone (TRU) (radio part) 23. The mobile telephone 23 communicates with a mobile telephone base cell (BS) 24 via antennas, and cell 24 is connected via a mobile telephone switching office (MTSO) 25, a FAX signal converting apparatus 26, and a standard facsimile apparatus (FAX 4) 27 to a telephone set (TEL 4) 28.

The FAX signal converting apparatus 26 may be integrally connected with the standard facsimile apparatus 27 for thereby serving together as a facsimile apparatus which includes both the standard transmission control procedure and the special transmission control procedure. The facsimile apparatus also includes means to determine which control procedure should be employed upon an exchange of handshake signals between the transmission and reception sides, for the purpose of assuring stable facsimile communications without deterioration in image quality regardless of the channel quality.

Figure 6:
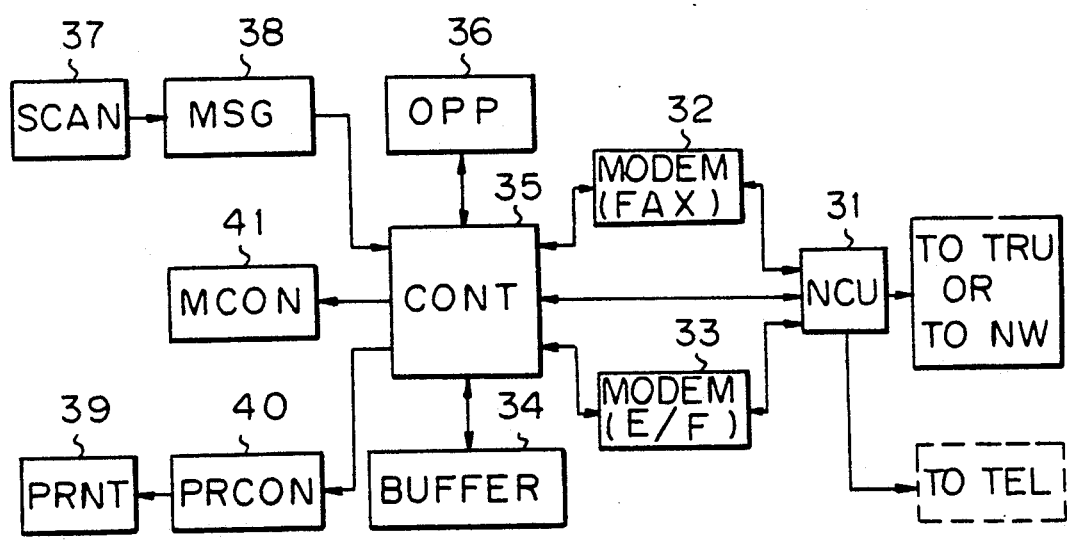
FIG. 6 is a block diagram showing a facsimile apparatus according to the present invention.

FIG. 6 is a block diagram illustrating the facsimile apparatus (FAX 3) 22. The facsimile apparatus 22 includes a network control unit (NCU) 31, a standard transmission control procedure modem (MODEM (FAX)) 32, a special transmission control procedure modem (MODEM (E/F)) 33, a buffer memory (BUFFER) 34, a control unit (CONT) 35, an operator control panel (OPP), a document scanning unit (SCAN)) 37, an image signal processing unit (MSG) 38, a printing unit (PRINT) 39, a printing control unit (PRCON) 40, and a mechanism control unit (MCON) 41.

The operation is as follows.

Once a document is fed to the facsimile apparatus 22 and the communication channel is set by an operator as described previously, the mechanism control unit 41 is operated under the control of the apparatus control unit 35 to start a series of read operations. The document scanning unit 37 provides a read-out result to the image signal processing unit 38 for converting it to an image signal, and the resulting image singal is sent to the apparatus control unit 35. The apparatus control unit 35, which includes a line memory and an image signal compressor operative under the MH and MR systems, processes the read-out result in a predetermined manner and stores the same in the buffer memory 34 as a transmission message. In addition, the apparatus control unit 35 continues to exchange handshake signals with the counterpart apparatus, thereby judging whether that apparatus is to conform to the standard transmission control procedure or the special one, for mode selection. The apparatus control unit 35 thereafter reads the foregoing message signal from the buffer memory 39, and executes the successive facsimile transmission utilizing either of the modems in conformity with the mode that has been selected.

During reception, after the communication channel has been set the apparatus control unit 35 selects the standard control procedure or the special transmission control procedure through a handshake exchange with the counterpart apparatus, and starts the facsimile communications. The buffer memory 34 stores the received message signal. The apparatus control unit 35 thereafter drives a receiver mechansim through the mechanism control unit 41 to retrieve the received message from the buffer memory 34 for demodulation of the image signal and conversion into a printing signal, and sends the resulting printing signal to the printing unit 39 for print-out onto a sheet of paper.

According to the method of facsimile communications of the present invention, as described above, stable facsimile communications with reduced deteriorization in image quality is assured even if the communication network includes a mobile system subnetwork or an open-wire carrier channel suffering various disturbances. In addition, the methode allows the intact use of an inexpensive, mass-produced standard facsimile machine, thereby assuring error-free facsimile communications at a low cost.

Furthermore, a facsimile apparatus including both a standard transmission control procedure and a special transmission control procedure provided with an error control function can also realize such error-free facsimile communications.

Although certain prefered embodiments have been shown and described, it should be understood that many changes and mofifications may be made therein without departing from the scope of the appended claims.

What is claimed is:

1. A facsimile signal converting apparatus for use with a facsimile apparatus to communicate with another facsimile apparatus via a network and another facsimile signal converting apparatus, the facsimile apparatus and the another facsimile apparatus being operative with a first communications protocol and at least a portion of the network being disposed between the facsimile apparatus and the another facsimile apparatus, said facsimile signal converting apparatus comprising:

first means for interfacing with the facsimile apparatus using the first communications protocol;

second means for interfacing with the another facsimile signal converting apparatus using a second communications protocol with an error control mode;

adaptive error control means for judging the quality of the network between the facsimile signal converting apparatus and the another facsimile signal converting apparatus, and for selecting the error control mode of the second communication protocol from a plurality of error control modes on the basis of the judged quality; and means for converting signals having the first protocol which are received from the facsimile apparatus by the first means to signals having the second protocol for transmission by the second means to the another facsimile signal converting apparatus, and for converting signals having the second protocol which are received from the another facsimile signal converting apparatus by the second means to signals having the first protocol for transmission by the first means to the facsimile signal converting apparatus.

2. The facsimile signal converting apparatus of claim 1, wherein the network has a node, and wherein one of the facsimile signal converting apparatus and the another facsimile signal converting apparatus is disposed in the vicinity of the node.

3. The facsimile signal converting apparatus of claim 1, wherein the first protocol is a standard protocol for communication by facsimile, and the second protocol is a special transmission control protocol.

4. The facsimile signal converting apparatus of claim 3, wherein the standard protocol which is compatible with standards established by CCITT.

5. A facsimile apparatus for use with a communication network having changeable transmission conditions, comprising:

means for communicating with the network using a first communications protocol, the first protocol being a standard protocol for communicating by facsimile and conforming to standards established by CCITT;

means for communicating with the network using a second communications protocol, the second protocol being a special transmission control protocol with an adaptive error control function which is responsive to the transmission conditions; and means for selecting either the first or the second protocol.

6. A method of facsimile communication between first and second facsimile apparatuses via a network and first and second facsimile signal converting apparatuses, the network including a portion with good transmission quality and a portion with bad transmission quality disposed between the facsimile apparatuses, the first facsimile signal converting apparatus exchanging signals with the first facsimile apparatus and with the second facsimile signal converting apparatus and the second facsimile signal converting apparatus exchanging signals with the second facsimile apparatus and with the first facsimile signal converting apparatus, said method comprising the steps of:

(a) detecting a facsimile signal issued from the second facsimile apparatus;

(b) judging the quality of the communication channel based on the detected facsimile signal;

(c) detecting another facsimile signal issued from the first facsimile apparatus;

(d) demodulating the another facsimile signal;

(e) applying predetermined error control to the signal demodulated in step (d) based on the judgement performed in step (b);

(f) modulating the signal to which the error control was applied in step (e); and (g) emitting the signal modulated in step (f).

7. A method of facsimile communication between first and second facsimile apparatus via a network having a portion with good transmission quality and a portion with bad transmission quality disposed between the facsimile apparatuses, each facsimile apparatus including means for communicating using a first communications protocol and means for communicating using a second communications protocol, the first protocol being a standard protocol for communicating by facsimile and conforming to standards established by CCITT, and the second protocol being a special transmission control protocol with an adaptive error control function for promoting error correction in response to the quality of the network, said method comprising the steps of:

(a) at the first facsimile apparatus, detecting a facsimile signal emitted by the second facsimile apparatus;

(b) judging the quality of the network based on the signal emitted by the second facsimile apparatus;

(c) selecting either the first protocol or the second protocol based on the judgment conducted in step (b); and (d) sending a signal with the protocol selected in step (c) from the first facsimile apparatus to the second facsimile apparatus.

* * * * *